(12) United States Patent
Na et al.

(10) Patent No.: US 10,903,946 B2
(45) Date of Patent: Jan. 26, 2021

(54) BASE STATION DEVICE FOR BLANKING RADIO RESOURCE OF MULTI POINT COMMUNICATION IN HETEROGENEOUS NETWORK AND METHOD FOR OPERATING SAME

(71) Applicants: SK TELECOM CO., LTD., Seoul (KR); INDUSTRY-ACADEMIC COOPERATION FOUNDATION, YONSEI UNIVERSITY, Seoul (KR)

(72) Inventors: Min Soo Na, Seongnam-si (KR); Tak Ki Yu, Yongin-si (KR); Young Lak Kim, Yongin-si (KR); Sung Ho Moon, Anyang-si (KR); Tae Guen Kim, Seongnam-si (KR); Dae Sik Hong, Seoul (KR); Han Ho Wang, Seongnam-si (KR); Yo Seop Park, Anyang-si (KR)

(73) Assignees: SK TELECOM CO., LTD., Seoul (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 7 days.

(21) Appl. No.: 15/327,008

(22) PCT Filed: Jun. 5, 2015

(86) PCT No.: PCT/KR2015/005660
§ 371 (c)(1),
(2) Date: Jan. 17, 2017

(87) PCT Pub. No.: WO2016/010259
PCT Pub. Date: Jan. 21, 2016

(65) Prior Publication Data
US 2017/0155483 A1 Jun. 1, 2017

(30) Foreign Application Priority Data

Jul. 16, 2014 (KR) ........................ 10-2014-0090039

(51) Int. Cl.
*H04L 5/00* (2006.01)
*H04B 7/024* (2017.01)
(Continued)

(52) U.S. Cl.
CPC ........... *H04L 5/0035* (2013.01); *H04B 7/024* (2013.01); *H04L 5/0094* (2013.01);
(Continued)

(58) Field of Classification Search
CPC ............ H04L 5/0035; H04W 72/0426; H04W 84/045; H04W 88/08
See application file for complete search history.

(56) References Cited

U.S. PATENT DOCUMENTS

| 9,231,723 B2 * | 1/2016 | Zhu | .................. H04W 4/90 |
| 2010/0039992 A1 * | 2/2010 | Prakash | ............... H04W 8/005 370/328 |

(Continued)

FOREIGN PATENT DOCUMENTS

| KR | 10-2013-0081621 A | 7/2013 |
| KR | 10-2014-0009463 A | 1/2014 |
| KR | 10-2014-0015904 A | 2/2014 |

OTHER PUBLICATIONS

Netmanias Talk, [Mobile] Interference Coordination in LTE/LTE-A (1): ICIC, (http://blog.naver.com/netmaniascom/220059912805, Jul. 14, 2014).

(Continued)

*Primary Examiner* — Robert C Sheibel
(74) *Attorney, Agent, or Firm* — Hauptman Ham, LLP

(57) ABSTRACT

A base station device of blanking a radio resource, includes: a base station selecting circuit to select a specific adjacent
(Continued)

base station for coordinated multi-point (CoMP) transmission and reception; a CoMP transmission and reception control circuit to blank out the radio resource which is allocated equally as the radio resource, which is allocated by the specific adjacent base station for a terminal which receives the CoMP transmission and reception from the base station device and the specific adjacent base station; and a resource allocation information sharing circuit to share resource allocation information, which represents that the radio resource is blanked out, with other adjacent base stations except for the specific adjacent base station, such that the other adjacent base stations are capable of using the resource allocation information.

6 Claims, 4 Drawing Sheets

(51) Int. Cl.
  *H04W 72/04* (2009.01)
  *H04W 88/08* (2009.01)
  *H04W 72/08* (2009.01)
  *H04W 84/04* (2009.01)
(52) U.S. Cl.
  CPC ....... *H04W 72/0426* (2013.01); *H04W 88/08* (2013.01); *H04W 72/082* (2013.01); *H04W 84/045* (2013.01)

(56) References Cited

U.S. PATENT DOCUMENTS

| | | | |
|---|---|---|---|
| 2012/0258724 A1* | 10/2012 | Kim | H04W 72/082 455/452.2 |
| 2014/0031049 A1* | 1/2014 | Sundaresan | H04W 84/042 455/447 |
| 2014/0044061 A1 | 2/2014 | Yue et al. | |
| 2014/0112288 A1* | 4/2014 | Wei | H04J 11/0053 370/329 |
| 2014/0226575 A1* | 8/2014 | Davydov | H04W 52/04 370/329 |
| 2015/0004994 A1* | 1/2015 | Hwang | H04W 24/02 455/452.1 |
| 2015/0334705 A1* | 11/2015 | Zhao | H04W 36/22 370/329 |
| 2015/0365934 A1* | 12/2015 | Liu | H04L 5/0039 370/329 |
| 2017/0272219 A1* | 9/2017 | Park | H04W 72/0486 |

OTHER PUBLICATIONS

Korean Office Action dated Jun. 29, 2015 in connection with the counterpart Korean Patent Application No. 10-2014-0090039.
International Search Report dated Aug. 20, 2015 corresponding to International Application No. PCT/KR2015/005660.

* cited by examiner

BASE STATION DEVICE FOR BLANKING RADIO RESOURCE OF MULTI POINT COMMUNICATION IN HETEROGENEOUS NETWORK AND METHOD FOR OPERATING SAME

CROSS REFERENCE TO RELATED APPLICATION

This application claims the priority of Korean Patent Application No. 10-2014-0090039, filed on Jul. 16, 2014 in the KIPO (Korean Intellectual Property Office). Further, this application is the National Phase application of International Application No. PCT/KR2015/005660 filed Jun. 5, 2015, which designates the United States and was published in Korean.

TECHNICAL FIELD

The present invention relates to a base station device which, in a heterogeneous network environment where various base stations forming cells with different sizes coexist in the same area, improves performance of coordinated multi-point (CoMP) transmission and reception by reflecting environmental characteristics that cells with difference sizes coexist, and an operating method of the base station device.

BACKGROUND ART

Generally, coordinated multi-point (CoMP) transmission and reception technology is the technology which improves transmission and reception performance of a user terminal by enabling at least two base stations to perform coordinated transmission and reception to and from a user terminal experiencing a high inter-cell interference or a user terminal located at a cell edge. This CoMP transmission and reception technology (in the following, referred to as "CoMP technology") has an object to improve performance of user terminals whose transmission and reception performance is worse than a certain level.

This conventional CoMP technology can be referred to as the technology which considers coordination among base stations of the same size in a macro cell environment (macro base stations).

Meanwhile, a heterogeneous network environment has recently emerged in which various base stations with different sizes (that is, various base stations forming cells of different sizes) coexist in the same area. In this heterogeneous network environment, various kinds of small base stations having smaller cell coverages than normal macro base stations are arranged, and they form macro cells and small cells in an area, where various kinds of base stations overlap, to provide wireless communication service to users.

When macro base stations and small base stations perform CoMP transmission and reception in the heterogeneous network environment, other small base stations located in the macro cell of the macro base station are affected by the macro base station and the small base station which are performing the CoMP transmission and reception.

Therefore, it is needed a measure which can reflect the environmental characteristic of the heterogeneous network environment in which cells with different sizes coexist so as to improve performance of CoMP.

DETAILED DESCRIPTION OF THE INVENTION

Technical Problem

The objective to be accomplished by the present invention is to provide a base station device and an operating method thereof which can improve performance of CoMP transmission and reception by reflecting environmental characteristic of a heterogeneous network environment.

Technical Solution

A base station device according to an embodiment of the present invention comprises: a base station selecting unit configured to select a specific adjacent base station for coordinated multi-point (CoMP) transmission and reception; a CoMP transmission and reception control unit configured to blank out a radio resource which is allocated equally as the radio resource, which is allocated by the specific adjacent base station, for a terminal which receives the CoMP transmission and reception from the base station device and the specific adjacent base station; and a resource allocation information sharing unit configured to share resource allocation information, which represents that the radio resource is blanked out, with other adjacent base stations except for the specific adjacent base station, such that the other adjacent base stations are capable of using the resource allocation information.

More particularly, the base station selecting unit can select the specific adjacent base station based on a distance from the base station device among adjacent base stations to which a terminal, which is capable of receiving the CoMP transmission and reception from the base station device, is connected.

More particularly, the resource allocation information can be shared through a backhaul which connects the base station device with the other adjacent base stations or a baseband unit (BU) which manages the base station device and the other adjacent base stations as remote radio units (RU).

More particularly, when the base station device is a macro base station, the specific adjacent base station and the other adjacent base stations are small base stations which are located in a cell coverage of the base station device; and, when the base station device is a small base station, the specific adjacent base station is a macro base station which has a cell coverage in which the base station device is located, and the other adjacent base stations are small base stations which are located in the cell coverage of the specific adjacent base station.

The base station device according to an embodiment of the present invention comprises: a resource allocation information acknowledging unit configured to acknowledge resource allocation information which represents that a radio resource is blanked out from an adjacent base station which performs coordinated multi-point (CoMP) transmission and reception and blanks out the radio resource allocated for a specific terminal; and a radio resource allocating unit configured to allocate the radio resource, which is recognized based on the resource allocation information, to a terminal with largest interference due to the adjacent base station among terminals which are connected to the base station device.

More particularly, the radio resource allocating unit can raise a level of a modulation and coding scheme (MCS) for the radio resource.

An operating method of a base station device according to an embodiment of the present invention comprises: a base station selecting step selecting a specific adjacent base station for coordinated multi-point (CoMP) transmission and reception; a CoMP transmission and reception controlling step blanking out a radio resource which is allocated equally as the radio resource, which is allocated by the specific adjacent base station, for a terminal which receives the CoMP transmission and reception from the base station device and the specific adjacent base station; and a resource allocation information sharing step sharing resource allocation information, which represents that the radio resource is blanked out, with other adjacent base stations except for the specific adjacent base station, such that the other adjacent base stations are capable of using the resource allocation information.

More particularly, the other adjacent base stations can recognize the radio resource, which is blanked out by the base station device, by using the resource allocation information, and allocate the radio resource to a terminal with largest interference due to the base station device among terminals which are connected to the other adjacent base stations.

More particularly, the other adjacent base stations can recognize the radio resource, which is blanked out by the base station device, by using the resource allocation information, and raise a level of a modulation and coding scheme (MCS) for the radio resource.

More particularly, the base station selecting step can select the specific adjacent base station based on a distance from the base station device among adjacent base stations to which a terminal, which is capable of receiving the CoMP transmission and reception from the base station device, is connected.

Advantageous Effects

Therefore, by using the base station device and the operating method thereof according to the present invention, it is possible to obtain an effect of improving performance of CoMP by reflecting environmental characteristics of a heterogeneous network environment.

BEST MODE

Hereinafter, one embodiment of the present invention will be described in detail by referring to appended drawings.

Figure 1:
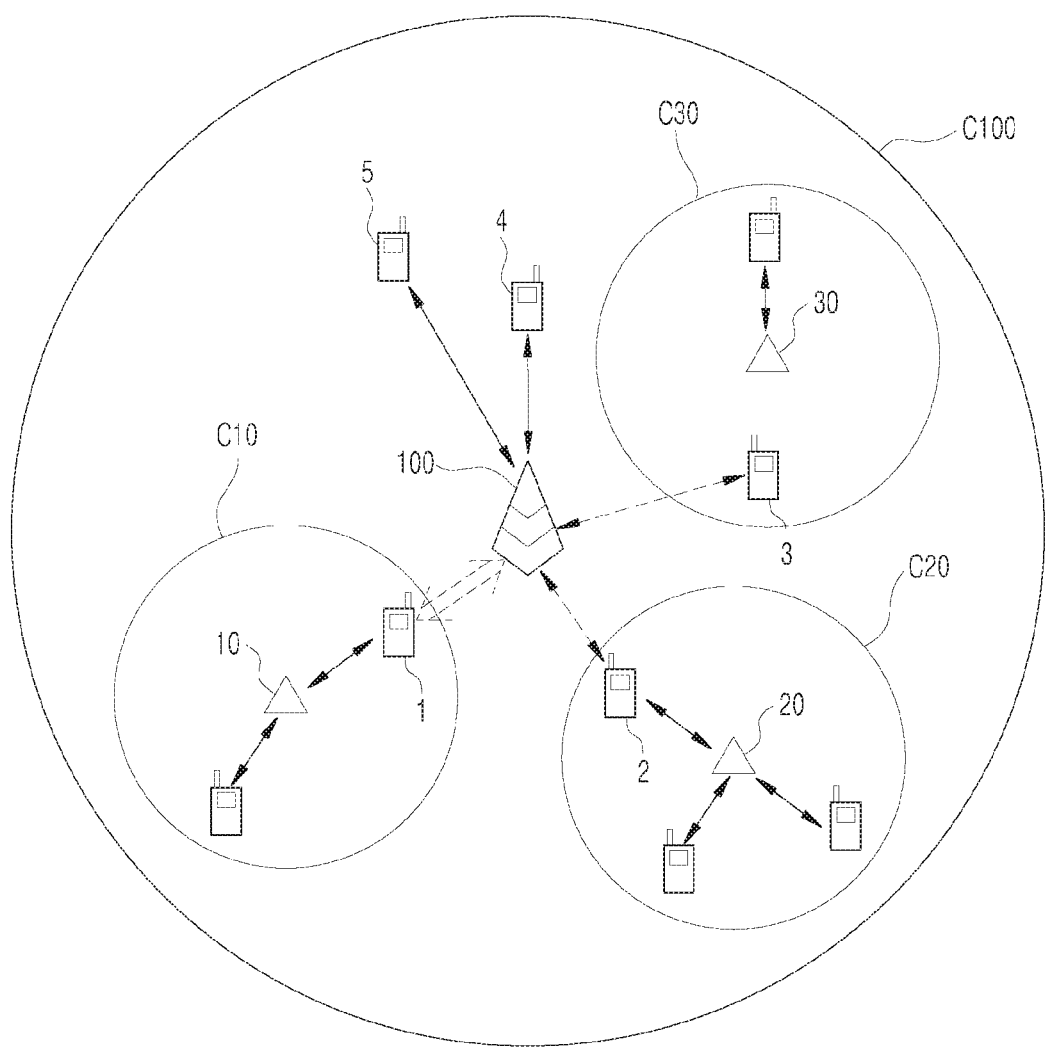
FIG. 1 is an illustration showing a heterogeneous network environment in which a base station device according to an embodiment of the present invention is included.

FIG. 1 shows a heterogeneous network environment in which a base station device according to an embodiment of the present invention is included.

As shown in FIG. 1, in the heterogeneous network environment to which the present invention applies, various base stations forming cells with different sizes, that is, a macro base station 100 which forms a macro cell C100, and small base stations 10, 20, and 30 which form cells C1, C2, . . . , C6 included in a coverage of a macro cell C100 of the macro base station 100 coexist in the same area.

It is needless to note that, in the heterogeneous network environment, various macro base stations including the macro base station 100 exist, and at least one small base station can exist in cells of respective macro base stations in the same way that small stations 10, 20, and 30 exist in the cell C100 of the macro base station 100.

However, for the sake of convenience of description, in the following, one macro base station 100 will be referred to as in FIG. 1, and small base stations 10, 20, and 30 existing in the cell C100 of the macro base station 100 will be referred to throughout the description.

In the meantime, in the heterogeneous network environment, the macro base station 100 and the small base stations 10, 20, and 30 can use the coordinated multi-point (CoMP) transmission and reception technology.

The coordinated multi-point (CoMP) transmission and reception technology is the technology which improves transmission and reception performance of a terminal by enabling at least two base stations to perform coordinated transmission and reception to and from a terminal experiencing a high inter-cell interference or a (user) terminal located at a cell edge. This CoMP transmission and reception technology has an object to improve performance of user terminals whose transmission and reception performance is worse than a certain level.

In the meantime, when the base stations cooperate with each other to perform CoMP, the base stations can be classified into one base station which provides benefits through CoMP and other base stations which receive the benefits through CoMP.

That is to say, when a macro base station performs CoMP with a small base station and provides benefits through CoMP to a terminal which is connected to the small base station, it can be generically called as macro-small base station (M-S) CoMP, while, when small base station performs CoMP with the macro base station and provides benefits through CoMP to a terminal which is connected to the macro base station, it can be generically called as small-macro base station (S-M) CoMP.

And, the present invention also relates, among the CoMP technology, to a dynamic point blanking (DPB) technology which blanks out a radio resource (or a resource block).

In the following, as for the DPB as one of the CoMP technology, the macro base station 100 and the small base station 10 are used as examples in the M-S CoMP case.

The macro base station 100 selects a terminal (for example: 1) to which the CoMP is to be provided by the macro base station 100 and the small base station 10. And, as for the selected terminal 1, the macro base station 100 blanks out the radio resource which is equally allocated as the radio resource which is allocated to the terminal 1 by the small base station 10.

Meanwhile, as for the terminal 1 to which the CoMP is to be provided by the small base station 10 and the macro base station 100, the small base station 10 normally transmits and receives data through the radio resource which is equally allocated by the macro base station 100.

Therefore, for the terminal 1 side which is connected to the small base station 10, interference due to the macro base station 100 can be avoided by blanking out the radio resource of the macro base station 100.

It is needless to note that the same will be applied to the S-M CoMP case for DPB as one of the CoMP technology, except that the subject which blanks out the radio resource is changed from the macro base station 100 to small base station 10.

By the way, when the macro base station 100 and the small base station 10 perform the CoMP transmission and reception in the heterogeneous network environment as mentioned in the above, other small base stations 20, 30 located in the macro cell C100 are affected by the macro base station 100 and the small base station (for example: 10) which are performing the CoMP.

Therefore, when base stations cooperate with one another to perform the CoMP (especially, DPB) by considering the environmental characteristic of the heterogeneous network environment in which cells (macro cells and small cells) with different sizes coexist, the performance of CoMP is expected to be improved and maximized by enabling other small base stations except for the base station performing the CoMP to use/utilize the results of the CoMP.

Therefore, the present invention is to provide a measure to improve and maximize the performance of DPB, which is one of the CoMP technology, and, more specifically, the present invention is to realize the measure using base station devices.

In the following, the configuration of the base station device according to an embodiment of the present invention will be described in more detail.

At first, the base station device according to a first embodiment of the present invention will be described by referring to FIG. 2.

The base station device according to a first embodiment of the present invention can be a macro base station or a small base station in the heterogeneous network environment.

In the following, for the sake of convenience of description, the base station device according to the present invention will be referred to as a macro base station as an example. And, the same reference numbers will be used as for the macro base station 100 shown in FIG. 1, and terms such as "the base station device 100" and "the macro base station 100" will be used if necessary.

Figure 2:
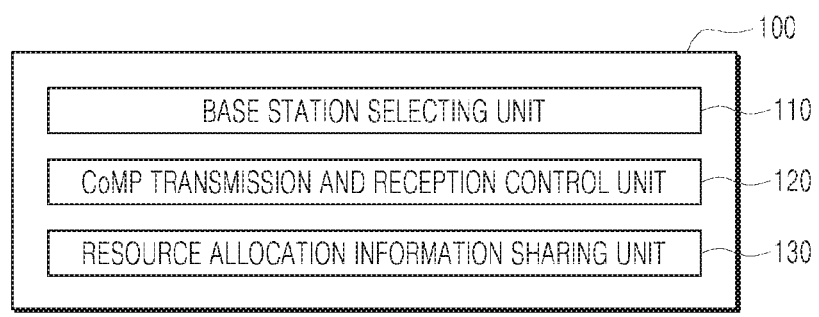
FIG. 2 is a block diagram which shows the configuration of the base station device according to a first embodiment of the present invention.

As shown in FIG. 2, the base station device 100 according to an embodiment of the present invention comprises: a base station selecting unit 110 which selects a specific adjacent base station for coordinated multi-point (CoMP) transmission and reception; a CoMP transmission and reception control unit 120 which blanks out a radio resource which is allocated equally as the radio resource, which is allocated by the specific adjacent base station, for a terminal which receives the CoMP transmission and reception from the base station device 100 and the specific adjacent base station; and a resource allocation information sharing unit 130 which shares resource allocation information, which represents that the radio resource is blanked out, with other adjacent base stations except for the specific adjacent base station, such that the other adjacent base stations are capable of using the resource allocation information.

In the meantime, when the base station device 100 according to the present invention is a macro base station as described in the above, the aforementioned specific adjacent base station and the other adjacent base stations will be small base stations located in the cell coverage C100 of the base station device 100.

When the base station device according to the present invention is a small base station (for example: 20 in FIG. 1), the aforementioned specific adjacent base station is a macro base station 100 which has a cell coverage C100 in which the base station device 20 is located, and the aforementioned other adjacent base stations are small base stations which are located in the cell coverage C100 of the specific adjacent base station 100.

Again, for the case in which the base station device 100 according to the present invention is the macro base station, the base station selecting unit 110 selects the specific adjacent base station for CoMP transmission and reception.

When described in more detail, the base station selecting unit 110 can select the specific adjacent base station based on a distance from the base station device 100 among adjacent base stations to which the terminal, which can receive the CoMP transmission and reception from the base station device 100, is connected.

For example, as shown in FIG. 1, a case where terminals 4, 5, . . . are connected to the base station device 100, and terminals 1, etc. terminal 2, etc., and terminal 3, etc. are connected to the small base station 10, small base station 20, and small base station 30, respectively, will be described.

In this case, each of the base station device 100, the small base station 10, the small base station 20, and the small base station 30 selects a terminal with low transmission and reception performance among the terminals which are connected to itself for receiving the CoMP.

For example, when describing by referring to the base station device 100, each of the terminals 4 and 5 which are connected to the base station device 100 measures a signal-to-interference plus noise ratio (SINR) for a Non-CoMP case where CoMP is not received through a common reference signal (CRS) and an interference measurement resource (IMR) and a SINR for a CoMP case, respectively, and feeds back the measured SINRs to the base station device 100.

The base station device 100 determines whether a SINR gain is smaller than a preset minimum SINR gain threshold value based on the SINRs fed back from each of the terminals 4 and 5, and can exclude the terminal whose SINR gain is smaller than the minimum SINR gain threshold value while selecting the terminals which require CoMP.

And, the base station device 100 determines whether current SINRs for the Non-CoMP case for each of the terminals 4 and 5 are greater than the preset minimum SINR threshold value, and can exclude the terminal whose current SNIR is greater than the preset minimum SINR threshold value while selecting the terminals which require CoMP.

And, the base station device 100 can select a predetermined number of the terminals having high spectral efficiency among Non-CoMP terminals, from each of the terminals 4 and 5, as the terminals which require CoMP.

Therefore, the base station device 100 can select the terminals which satisfy all of the aforementioned conditions, among the terminals 4 and 5 which are connected to itself, as the terminals which are required to receive the CoMP transmission and reception.

In the same manner, the small base station 10, the small base station 20, and the small base station 30 can also select the terminals which are required to receive the CoMP transmission and reception in the same way as for the aforementioned base station device 100.

And, although each of the base station device 100, the small base station 10, the small base station 20, and small base station 30 can select the terminals which are required to receive the CoMP transmission and reception by using the method described in the above, it can also select the terminals using other conventional methods.

In the following, it is assumed that the base station device 100 selects no terminal as the terminal which is required to receive the CoMP transmission and reception while the small base station 10 selects the terminal 1, the small base station 20 selects the terminal 2, and the small base station 30 selects the terminal 3.

Like this, each of the terminals 1, 2, and 3 which are selected as the terminals which are required to receive the CoMP transmission and reception comes to select a base station from which the CoMP transmission and reception is received, except for the base station to which it is connected.

For example, when describing by referring to the terminal 1, the terminal 1 measures a CRS or a channel state information-reference signal (CSI-RS) received from other base stations except for the currently-connected small base station 10, measures the reference signal received power (RSRP), and feeds it back to the small base station 10.

Therefore, the small base station 10 can select the base station for which the highest received power is measured, e.g. the macro base station 100, as the base station which is required to provide the CoMP transmission and reception, based on the received power for other base stations fed back from the terminal 1.

In this manner, the terminal 1 can select the base station for which the highest received power is measured, e.g. the macro base station 100 among other base stations except for the currently-connected small base station 10 as the base station which is required to provide the CoMP transmission and reception.

In the same manner, terminals 2 and 3 which are selected as the terminals which are required to receive the CoMP transmission and reception can also select the base station which is required to receive the CoMP transmission and reception in the same manner as for the aforementioned terminal 1.

Meanwhile, although, in the above, the terminal which is required to receive the CoMP transmission and reception is selected first and then the selected terminal selects the base station which is required to receive the CoMP transmission and reception, it is merely an example, and it is also possible that the terminal selects the base station which is required to receive the CoMP transmission and reception and then the selected base station determines whether the selected terminal requires to receive the CoMP transmission and reception.

In the following, description will be made based on the assumption that all the terminals 1, 2, and 3 which are selected as the terminals which are required to receive the CoMP transmission and reception select the macro base station 100 as the base station which is required to receive the CoMP transmission and reception.

In this case, the base station selecting unit 110 can select the specific adjacent base station based on a distance from the base station device 100 among adjacent base stations (that is small base stations 10, 20, and 30) to which the terminals 1, 2, and 3 which can receive the CoMP transmission and reception from the base station device 100 are connected.

For example, the base station selecting unit 110 selects the small base station (for example: 10) which is the closest to the base station device 100 based on the distance from the base station device 100 among the small base stations 10, 20, and 30.

This is the selection based on an environmental characteristic that, more interference will occur due to the signal from the base station device 100 as the distance to the base station device 100 decreases.

Therefore, the base station selecting unit 110 can apply to every method, along with the method using the distance to the base station device 100, which can select the small base station generating largest interference due to the signal from the base station device 100 among the small base stations 10, 20, and 30 to which the terminals 1, 2, and 3, which can receive the CoMP transmission and reception from the base station device 100, are connected.

For example, the base station selecting unit 110 can select the small base station (for example: 10), to which the terminal (for example: 1) having the smallest SINR is connected as the specific adjacent base station among small base stations 10, 20, and 30 to which the terminals 1, 2, and 3 are connected, based on the SINR measured at the terminals 1, 2, and 3 which can receive the CoMP transmission and reception from the base station device 100.

Also, this is the selection based on the environmental characteristic that more interference due to the signal from the base station device 100 will occur for the small base station to which the terminal with the smaller SINR is connected among the small base stations to which the terminal which can receive the CoMP transmission and reception from the base station device 100.

In the following, for the sake of convenience of description, the case in which the base station selecting unit 110 selects the small base station 10 as the specific adjacent base station will be described.

For the terminal 1 which receives the CoMP transmission and reception from the base station device 100 and the specific adjacent base station (that is the small base station 10), the CoMP transmission and reception control unit 120 blanks out the radio resource which is equally allocated by the small base station 10.

In other words, as for the terminal 1 to which the CoMP is to be provided by the small base station 10 and the base station device 100, the CoMP transmission and reception control unit 120 performs the CoMP to blank out the radio resource which is equally allocated to the small base station 10.

Figure 4:
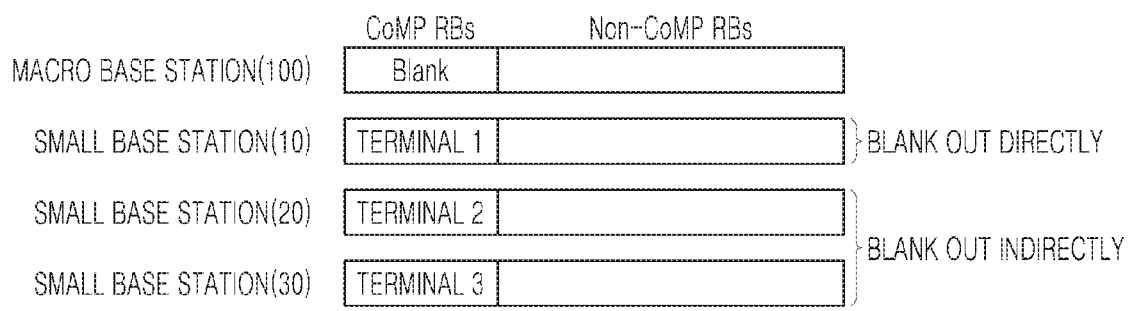
FIG. 4 is an illustration which shows improvement in performance of CoMP transmission and reception according to an embodiment of the present invention.

Therefore, as shown in FIG. 4, the macro base station device 100 according to the present invention can blank out the radio resource (CoMP RBs) which is allocated to the terminal 1 among the radio resources (CoMP RBs) which can be allocated for CoMP. It is needless to note that the macro base station device 100 according to the present invention will allocate the rest radio resources (Non_CoMP RBs) which are not the radio resource that can be allocated for CoMP among the radio resource of its own to other terminals which are connected to itself.

Meanwhile the small base station 10 can normally transmit and receive data through the radio resource which is equally allocated to the terminal 1 by the base station device 100.

That is to say, as shown in FIG. 4, the small base station 10 allocates the radio resource (CoMP RBs) which is blanked out by the macro base station 100 to the terminal 1 and normally transmits or receives the data. Therefore, for the terminal 1, the interference which is generated by the base station device 100 can be avoided due to the radio resource blank-out of the base station device 100.

Therefore, the base station device 100 and the small base station 10 performs CoMP and, more specifically, M-S CoMP for the terminal as described in the above, and provide the benefit generated by CoMP for the terminal 1 connected to the small base station 10, that is the effect (benefit) of improving transmission/reception performance (for example: process amount of the terminal) of the terminal 1 thanks to the avoidance of interference.

In the meantime, the resource allocation information sharing unit 130 shares resource allocation information, which represents that the radio resource is blanked out by the CoMP transmission and reception control unit 120, with other adjacent base stations (that is, other small base stations 20 and 30) except for the small base station 10 which currently performs CoMP.

Here, the aforementioned resource allocation information can be shared through a backhaul which connects the base station device 100 with the other adjacent base stations (that is, other small base stations 20 and 30), or a baseband unit (BU) which manages the base station device 100 and the small base stations 20 and 30 as remote radio units (RU).

For example, the macro base station device 100 according to the present invention and the small base stations 10, 20, and 30 can be interconnected with each other through a separate backhaul.

Alternatively, when a communications system having a configuration in which a baseband unit (BU) for managing radio resources and a remote radio unit (RU) for managing physical signal transmission and reception are separated from each other is considered, the macro base station device 100 according to the present invention and the small base stations 10, 20, and 30 can be allocated to respective RUs which are managed by one BU.

In this case, the macro base station device 100 according to the present invention and the small base stations 10, 20, and 30 can be interconnected by one BU without using a separate backhaul.

Therefore, the resource allocation information sharing unit 130 can also share the resource allocation information, which represents that the radio resource is blanked out by the CoMP transmission and reception control unit 120, with other small base stations 20 and 30 except for the small base station 10 which currently performs CoMP.

Therefore, other small base stations 20 and 30 except for the small base station 10 which currently performs CoMP with the base station device 100 also can use the resource allocation information shared by the base station device 100, and, more specifically, it can indirectly obtain the benefit (effect) due to the CoMP performed by the base station device 100 and the small base station 10, as described in the above.

Meanwhile, although the R-S CoMP case in which the base station device according to the present invention is the macro base station is mainly described, this is merely an embodiment and it will be apparent that the objective of the present invention is accomplished through the aforementioned functions also for the S-M CoMP case in which the base station device according to the present invention is the small base station.

In other words, when the base station device according to the present invention is the small base station (for example: 30), the base station device 30 according to the present invention will select the macro base station 100 as the specific adjacent base station for CoMP, as described in the above. And, the base station device 30 according to the present invention will perform the CoMP which blanks out the radio resource, which is equally allocated by the macro base station 100 for the terminal which will provide the CoMP transmission and reception with the macro base station 100 (terminal connected to the macro base station 100, not shown in figures) (that is, the S-M CoMP). Also, the base station device 30 according to the present invention will share the resource allocation information which represents that the radio resource is blanked out with other adjacent base stations except for the macro base station 100, such that the small base stations 10 and 20 can use the resource allocation information.

Meanwhile, in the following, the base station device according to a second embodiment of the present invention will be described by referring to FIG. 3.

The base station device according to the second embodiment of the present invention is a small base station and, more specifically, it corresponds to the small base station which directly obtains the benefit (effect) due to the CoMP performed by the macro base station 100 and the small base station 10 in the description referring to FIG. 2.

In the following, for the sake of convenience of description, the base station device according to the present invention will be referred to as a small base station 20 as an example. And, the same reference numbers will be used as for the small base station 20 shown in FIG. 1, and terms such as "the base station device 20" and "the small base station 20" will be used if necessary.

Figure 3:
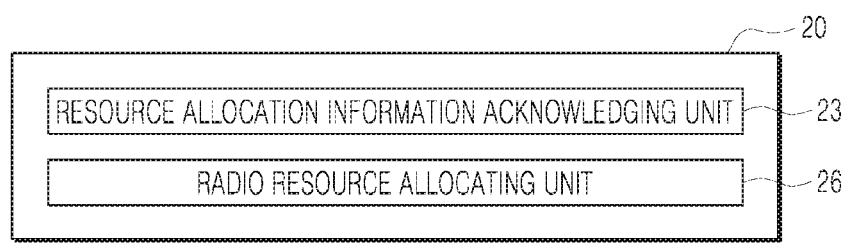
FIG. 3 is a block diagram which shows the configuration of the base station device according to a second embodiment of the present invention.

As shown in FIG. 3, the base station device 20 according to the present invention includes: a resource allocation information acknowledging unit 23 which, from an adjacent base station which performs CoMP transmission and reception blanking out a radio resource allocated for a specific terminal, acknowledges resource allocation information which represents that the radio resource is blanked out; and a radio resource allocating unit 26 which allocates the radio resource, which is recognized based on the resource allocation information, to a terminal with largest interference due to the adjacent base station among the terminals which are connected to the base station device 20.

In the following, for the sake of convenience of description, the case in which the macro base station 100 and the small base station 10 cooperate to perform CoMP will be described as in the description referring to the aforementioned FIG. 2.

In this case, the aforementioned specific terminal is the terminal 1 which receives the CoMP transmission and reception from the macro base station 100 and the small base station 10 and the aforementioned adjacent base station can be the macro base station 100 or the small base station 10 which is the base station which blanks out the radio resource during CoMP.

Therefore, the resource allocation information acknowledging unit 23 can acknowledge the resource allocation information, which represents that the radio resource is blanked out, from the adjacent base station (that is, the macro base station 100) which performs CoMP blanking out the radio resource allocated for the terminal 1.

In the meantime, the resource allocation information acknowledging unit 23 can acknowledge the resource allocation information from the macro base station 100 based on the sharing through a backhaul which connects the small base station device 20 according to the present invention with the macro base station 100, or a BU which manages the small base station 20 and the macro base station 100 as RU.

The radio resource allocating unit 26 recognizes the radio resource blanked out by the macro base station 100 based on the resource allocation information, and allocates the recognized radio resource to a terminal with the largest interference generated by the macro base station 100 among the terminals which are connected to the base station device 20.

When described by referring to FIG. 1, since the more interference will be generated by the macro base station 100 for the terminal which is located at a cell edge of a small cell C20, the terminal 2 will be the terminal with the largest interference generated by the macro base station 100 among the terminals which are connected to the small base station 20.

Therefore, when the radio resource, which is blanked out by the macro base station 100, has been allocated to other terminals, the radio resource allocating unit 26 can perform scheduling for allocating radio resources to terminals one more time such that the radio resource can be allocated to the terminal 2 which has the largest interference generated by the macro base station 100.

It is needless to note that when the radio resource, which is blanked by the macro base station 100, has already been allocated to terminal 2, the radio resource allocating unit 26 does not have to perform the scheduling again.

Therefore, as for the terminal 2, although it does not receive the CoMP transmission and reception directly from the macro base station 100, it can also obtain an indirect CoMP benefit (effect) which avoids the interference generated by the macro base station 100 through the radio resource which is blanked out the CoMP performed by the macro base station 100 and the small base station 10.

In the same manner, when the radio resource which is blanked by the base station device 100 is recognized by using the resource allocation information, the small base station 30 according to the second embodiment of the present invention can also perform rescheduling which allocates the radio resource to a terminal (for example: 3) with the largest interference due to the base station device 100 among the terminals which are connected to itself.

Therefore, when described by referring to FIG. 4, although the terminal 2 and terminal 3 of the small base stations 20 and 30 according to second embodiment of the present invention do not receive the CoMP transmission and reception directly from the macro base station 100, they can also obtain an indirect CoMP benefit (effect) which avoids the interference generated by the macro base station 100 through the radio resource which is blanked out the CoMP performed by the macro base station 100 and the small base station 10.

Furthermore, the radio resource allocating unit 26 can recognize the radio resource, which is blanked out by the base station device 100, by using the resource allocation information, and raise a level of a modulation and coding scheme (MCS) for the recognized radio resource.

That is to say, when the radio resource which is blanked out by the macro base station 100 is recognized, the radio resource allocating unit 26 can raise the level of the data transmission scheme, that is, the modulation and coding scheme (MCS) for the radio resource, such that data can be transmitted and received at higher coding rates through the radio resource.

Therefore, as for the terminal side to which the radio resource has already been allocated from the small base station 20, although it does not receive the CoMP transmission and reception directly from the macro base station 100, it can also obtain an indirect CoMP benefit (effect) which improves data transmission and reception performance (for example: terminal processing amount) by raising the level of MCS by using the radio resource blanked out by the CoMP performed by the macro base station 100 and the small base station 10.

It is needless to note that, when the radio resource which is blanked out by the macro base station 100 is recognized, the radio resource allocating unit 26 can perform the both the raising of the level of MCS and the rescheduling which have been mentioned in the above.

As described in the above, by using the base station device according to an embodiment of the present invention, when macro base stations and small base stations cooperate with one another to perform the CoMP (especially, DPB) by considering the environmental characteristic of the heterogeneous network environment, the effect of performing CoMP is expected to be used or utilized by other small base stations except for the base station which performs the CoMP, such that the performance of CoMP can be more enhanced and maximized.

Figure 5:
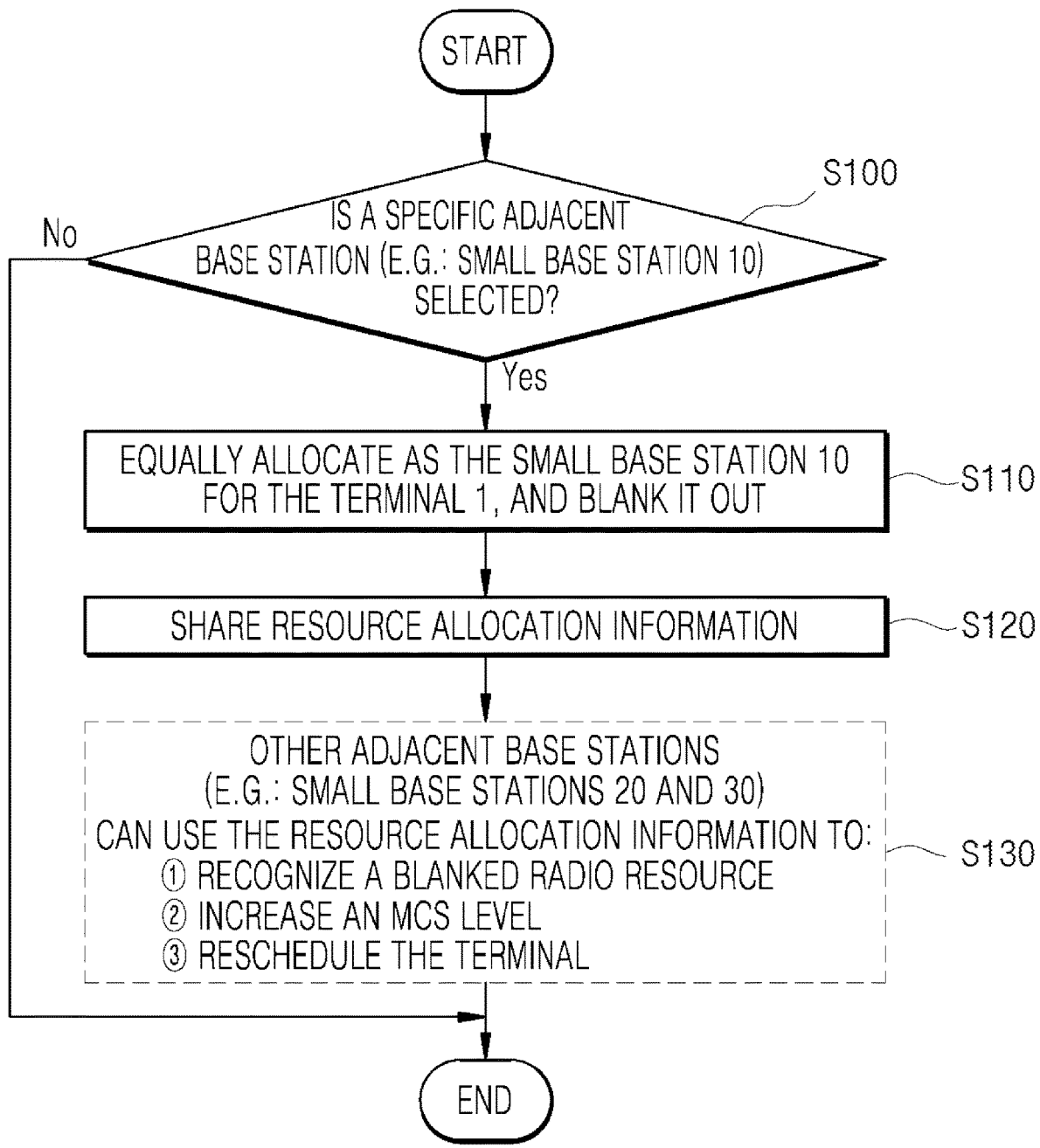
FIG. 5 is a control flowchart which shows the operating method of the base station device according to one embodiment of the present invention.

In the following, an operating method of the base station device according to an embodiment of the present invention will be described in detail by referring to FIG. 5. Here, reference numbers in FIGS. 1 to 4 will be referred to for the convenience of description.

In the following, for the sake of convenience of description, the case in which the base station device according to the present invention is the macro base station will be described, the same reference numbers will be used as for the macro base station 100 shown in FIG. 1, and terms such as "the base station device 100" and "the macro base station 100" will be used if necessary.

The operating method of the base station device 100 according to an embodiment of the present invention can select the specific adjacent base station based on a distance from the base station device 100 among adjacent base stations to which the terminal, which can receive the CoMP transmission and reception from the base station device 100, is connected (Yes in S100).

For example, as shown in FIG. 1, a case where terminals 4 and 5 are connected to the base station device 100, and terminals 1, terminal 2, and terminal 3 are connected to the small base station 10, small base station 20, and small base station 30, respectively, will be described.

In this case, each of the base station device 100, the small base station 10, the small base station 20, and the small base station 30 selects a terminal with a terminal with low transmission and reception performance for receiving the CoMP among the terminals which are connected to itself.

For example, as shown in FIG. 1, a case where terminals 4, 5, . . . are connected to the base station device 100, and terminals 1, etc. terminal 2, etc., and terminal 3, etc. are connected to the small base station 10, small base station 20, and small base station 30, respectively, will be described.

In this case, the base station device 100, the small base station 10, the small base station 20, and the small base station 30 select a terminal with low transmission and reception performance for receiving the CoMP among the terminals which are connected to itself.

Therefore, it is assumed that the base station device 100 selects no terminal as the terminal which is required to receive the CoMP transmission and reception while the small base station 10 selects the terminal 1, the small base station 20 selects the terminal 2, and the small base station 30 selects the terminal 3.

In this manner, each of the terminals 1, 2, and 3 which are selected as the terminals which are to receive the CoMP transmission and reception comes to select a base station from which the CoMP transmission and reception is received, except for the base station to which it is connected.

In the following, description will be made based on the assumption that all the terminals 1, 2, and 3 which are selected as the terminals which are to receive the CoMP transmission and reception select the macro base station 100 as the base station which is required to receive the CoMP transmission and reception.

In this case, the operating method of the base station device 100 according to an embodiment of the present invention can select the small base station (for example: 10) which is closest to the base station device 100 as the specific adjacent base station based on a distance from the base station device 100 among adjacent base stations 10, 20, and 30 to which the terminals 1, 2, and 3, which can receive the CoMP transmission and reception from the base station device 100, is connected (Yes in S100).

When the specific adjacent base station to perform CoMP cannot be selected (No in S100), the operating method of the base station device 100 according to an embodiment of the present invention will not perform steps S110 to S130 which will be described in the following.

When describing the case in which the small base station 10 is selected as the specific adjacent base station, the operating method of the base station device 100 according to an embodiment of the present invention, for the terminal 1 which receives the CoMP transmission and reception from the base station device 100 and the small base station 10, blanks out the radio resource which is equally allocated for the small base station 10 (S110).

In other words, as for the terminal 1 to which the CoMP is to be provided by the small base station 10 and the base station device, the operating method of the base station device 100 according to an embodiment of the present invention performs the CoMP to blank out the radio resource which is equally allocated to the small base station 10.

In the meantime, the operating method of the base station device 100 according to an embodiment of the present invention shares resource allocation information, which represents that the radio resource is blanked out in step S110 as described in the above, with other adjacent base stations (that is, other small base stations 20 and 30) except for the small base station 10 which currently performs the CoMP.

That is to say, the operating method of the base station device 100 according to an embodiment of the present invention, can share the resource allocation information, which represents that the radio resource is blanked, with other adjacent base stations except for the small base stations 20 and 30 which currently perform the CoMP, by using a connection relation by the backhaul or BU.

Therefore, other small base stations 20 and 30 except for the small base station 10 which currently performs CoMP with the base station device 100 also can use the resource allocation information shared by the base station device 100, and, more specifically, it can indirectly obtain the benefit (effect) due to the CoMP performed by the base station device 100 and the small base station 10, as described in the above (S130).

Specified embodiments in which small base stations 20 and 30 use the resource allocation information will be described as follows.

According to an embodiment, the small base station 20 and the small base station 30 can recognize the radio resource which is blanked out by the macro base station 100 by using the aforementioned shared resource allocation information, and allocate the recognized resource to the terminal which has the largest interference due to the base station device 100 among the terminals which are connected to itself.

For example, when described by referring to the small base station 20, when the radio resource which is blanked out by the macro base station 100 is recognized by using the aforementioned shared resource allocation information, the small base station 20 can allocate the recognized resource to the terminal which has the largest interference due to the base station device 100 among the terminals which are connected to itself.

When described by referring to FIG. 1, since the more interference will be generated by the base station device 100 for the terminal which is located at a cell edge of a small cell C20, the terminal 2 will be the terminal with the largest interference generated by the base station device 100 among the terminals which are connected to the small base station device 20.

Therefore, after recognizing the radio resource, which is blanked out by the base station device 100, when the radio resource blanked out by the base station device 100 has been allocated to other terminals, the small base station 20 can perform scheduling for allocating radio resources to terminals one more time such that the radio resource is allocated to the terminal 2 which has the largest interference generated by the macro base station 100.

It is needless to note that when the radio resource, which is blanked by the macro base station 100, has already been recognized and allocated to terminal 2, the small base station 20 does not have to perform the scheduling again.

Therefore, as for the terminal 2, although it does not receive the CoMP transmission and reception directly from the base station device 100, it can also obtain an indirect CoMP benefit (effect) which avoids the interference generated by the base station device 100 through the radio resource which is blanked out the CoMP performed by the base station device 100 and the small base station 10.

In the same manner, when the radio resource which is blanked by the base station device 100 is recognized by using the resource allocation information, the small base station 30 can also perform rescheduling which allocates the radio resource to a terminal (for example: 3) with the largest interference due to the base station device 100 among the terminals which are connected to itself.

Therefore, when described by referring to FIG. 4, although the terminal 2 of the small base station 20 and the terminal 3 of the small base stations 30 do not receive the CoMP transmission and reception directly from the macro base station 100, they can also obtain an indirect CoMP benefit (effect) which avoids the interference generated by the base station device 100 through the radio resource which is blanked out the CoMP performed by the base station device 100 and the small base station 10.

According to another embodiment, the small base station 20 and the small base station 30 can recognize the radio resource which is blanked out by the macro base station 100 by using the aforementioned shared resource allocation information, and raise the level of the MCS for the recognized radio resource.

For example, when described by referring to the small base station 20 the small base station 20, when the radio resource which is blanked out by the base station device 100 is recognized, can raise the level of the data transmission scheme, that is, the modulation and coding scheme (MCS) for the radio resource, such that data can be transmitted and received at higher coding rates through the radio resource.

Therefore, as for the terminal side to which the radio resource has already been allocated from the small base station 20, although it does not receive the CoMP transmission and reception directly from the base station device 100, it can also obtain an indirect CoMP benefit (effect) which improves data transmission and reception performance (for example: terminal processing amount) by raising the level of MCS by using the radio resource blanked out by the CoMP performed by the base station device 100 and the small base station 10.

According to still another embodiments, when the radio resource which is blanked out by the base station device 100 is recognized by using the aforementioned shared resource allocation information, the small base station 20 and the small base station 30 can perform both the raising the level of the MCS and rescheduling which are described in the above As described in the above, by using the operating method of the base station device according to an embodiment of the present invention, when macro base stations and small base stations cooperate with one another to perform the CoMP (especially, DPB) by considering the environmental characteristic of the heterogeneous network environment, the effect of performing CoMP is expected to be used or utilized by other small base stations except for the base station which performs the CoMP, such that the performance of CoMP can be more enhanced and maximized.

The operating method of the base station device according to the present invention can be embodied as program instructions executable by various computer means and recorded on a computer-readable medium. The computer-readable medium can include program instructions, data files, data structures, etc. exclusively or in combination. The program instructions recorded on the medium can be specifically designed and configured for the present invention or well known to be available by a skilled artisan in computer software. In the example of the computer-readable recording medium, magnetic media such as hard disks, floppy disks, and magnetic tapes, optical media such as compact disk-read only memories (CD-ROM), digital versatile disks (DVDs), magneto-optical media such as floptical disks, and hardware devices specially configured to store and execute program instructions such as read only memories (ROMs), random access memories (RAMs), flash memories, etc. are included. In the example of the computer instructions, machine language codes created by a compiler as well as a high level language code executable by a computer using an interpreter, etc. are included. The hardware device can be configured to operate as one or more software module for performing the operations of the present invention, and vice versa.

Although the present invention is described in detail by referring to preferred embodiments, the present invention is not restricted to these embodiments; and it is to be understood that the technical scope of the present invention encompasses the scope in which those skilled in the art can readily modify or change the embodiments without departing from the subject matter of the present invention defined in the appended claims.

The invention claimed is:

1. A base station device for blanking a radio resource, the base station device configured to
 determine a terminal, which is connected to a specific adjacent base station adjacent to a macro base station or one of small base stations included in the macro base station, for coordinated multi-point (CoMP) transmission and reception based on a signal-to-interference plus noise ratio (SINR) of the terminal,
 wherein the base station device comprises:
  a base station selecting circuit configured to
   select, based on a distance from the base station device, the specific adjacent base station among adjacent base stations to which the terminal, which is capable of receiving the CoMP transmission and reception from the base station device, is connected;
  a CoMP transmission and reception control circuit configured to blank out a radio resource of the terminal which is allocated by the base station device, wherein the radio resource of the terminal is a radio resource among one or more radio resources allocated by the base station device, and the radio resource of the terminal is equal to a radio resource allocated, by the specific adjacent base station, to the terminal such that the terminal receives the CoMP transmission and reception performed between the base station device and the specific adjacent base station; and
  a resource allocation information sharing circuit configured to share resource allocation information, which represents that the radio resource of the terminal is blanked out, with other adjacent base stations except for the specific adjacent base station, such that the other adjacent base stations are capable of using the resource allocation information,
 wherein
  when the base station device is a macro base station, the specific adjacent base station and the other adjacent base stations are small base stations which are located in a cell coverage of the base station device and interconnected by one baseband unit (BU), and
  when the base station device is a small base station, the specific adjacent base station is a macro base station which forms a cell coverage in which the base station device is located, and the other adjacent base stations are small base stations which are located in the cell coverage of the specific adjacent base station and interconnected by the BU, and
 wherein the resource allocation information is shared through the BU which manages the base station device and the other adjacent base stations as remote radio units (RU).

2. The base station device of claim 1, further comprising:
 a resource allocation information acknowledging circuit configured to acknowledge resource allocation information which represents that a radio resource is blanked out from an adjacent base station which performs coordinated multi-point (CoMP) transmission and reception and blanks out the radio resource allocated for a specific terminal; and
 a radio resource allocating circuit configured to allocate the radio resource, which is recognized based on the resource allocation information, to a terminal with largest interference due to the adjacent base station among the other terminals which are connected to the base station device.

3. The base station device of claim 2, wherein the radio resource allocating circuit raises a level of a modulation and coding scheme (MCS) for the radio resource.

4. An operating method of a base station device for blanking a radio resource, the operating method comprising:
 determining a terminal, which is connected to a specific adjacent base station adjacent to a macro base station or one of small base stations included in the macro base station, for coordinated multi-point (CoMP) transmission and reception based on a signal-to-interference plus noise ratio (SINR) of the terminal,
 wherein the determining a terminal comprising:
  selecting, based on a distance from the base station device, the specific adjacent base station among adjacent base stations to which the terminal, which is capable of receiving the CoMP transmission and reception from the base station device, is connected;

blanking out a radio resource of the terminal which is allocated by the base station device, wherein the radio resource of the terminal is a radio resource among one or more radio resources allocated by the base station device, and the radio resource of the terminal is equal to a radio resource allocated, by the specific adjacent base station, to the terminal such that the terminal receives the CoMP transmission and reception performed between the base station device and the specific adjacent base station; and sharing resource allocation information, which represents that the radio resource of the terminal is blanked out, with other adjacent base stations except for the specific adjacent base station, such that the other adjacent base stations are capable of using the resource allocation information, wherein when the base station device is a macro base station, the specific adjacent base station and the other adjacent base stations are small base stations which are located in a cell coverage of the base station device and interconnected by one baseband unit (BU), and when the base station device is a small base station, the specific adjacent base station is a macro base station which forms a cell coverage in which the base station device is located, and the other adjacent base stations are small base stations which are located in the cell coverage of the specific adjacent base station and interconnected by the BU, and wherein the resource allocation information is shared through the BU which manages the base station device and the other adjacent base stations as remote radio units (RU).

5. The operating method of a base station device of claim 4, wherein the other adjacent base stations recognize the radio resource, which is blanked out by the base station device, by using the resource allocation information, and allocate the radio resource to a terminal with largest interference due to the base station device among terminals which are connected to the other adjacent base stations.

6. The operating method of a base station device of claim 4, wherein the other adjacent base stations recognize the radio resource, which is blanked out by the base station device, by using the resource allocation information, and raises a level of a modulation and coding scheme (MCS) for the radio resource.

* * * * *